Oct. 29, 1929.  C. ZWICKER  1,733,711
VARIABLE CONDENSER
Filed July 30, 1926  2 Sheets-Sheet 1
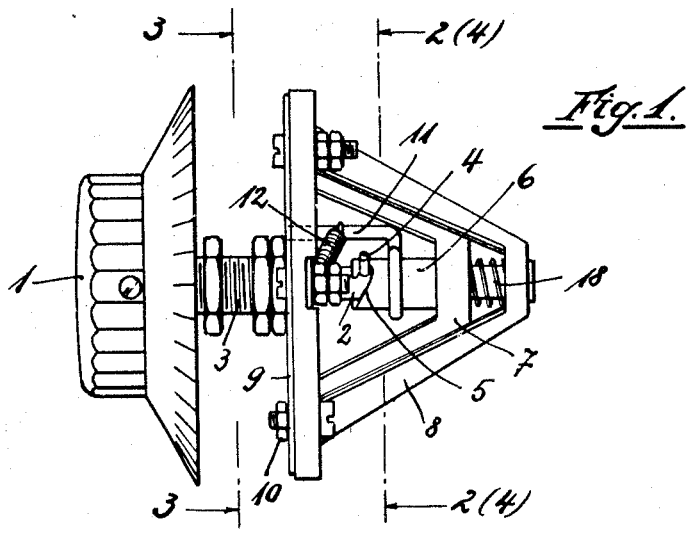
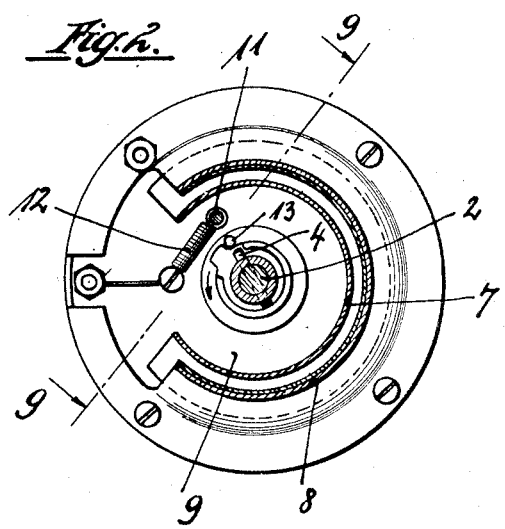
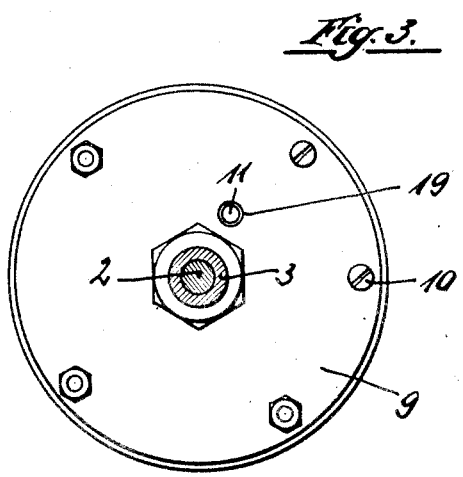
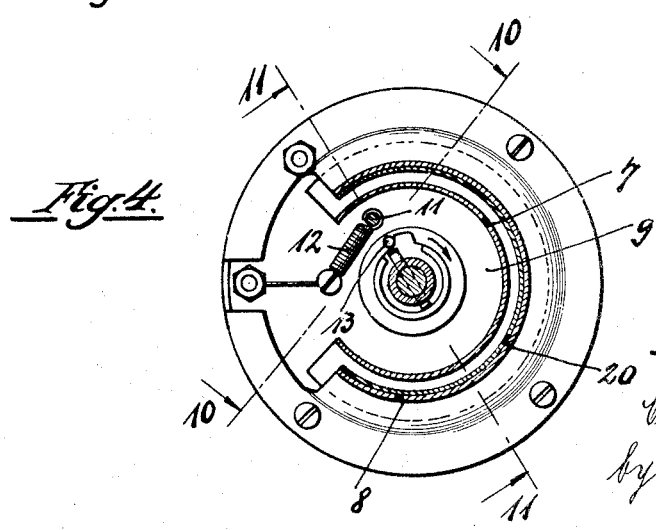
Inventor:
Christian Zwicker
by
Atty.

Oct. 29, 1929.                    C. ZWICKER                    1,733,711
                                VARIABLE CONDENSER
                            Filed July 30, 1926        2 Sheets-Sheet 2
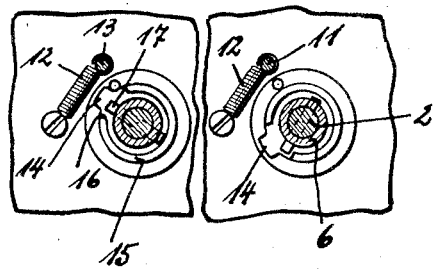
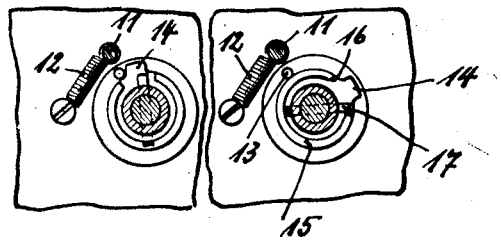
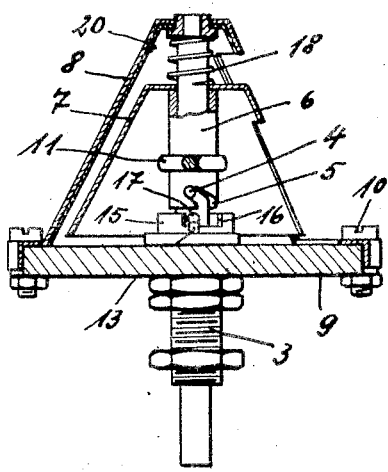
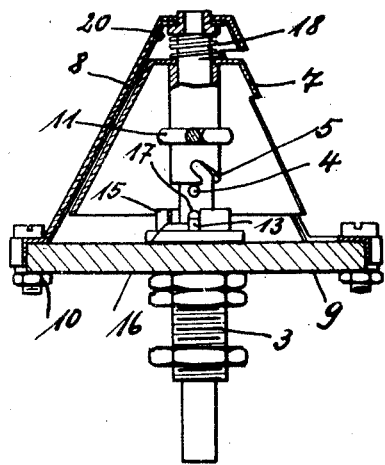
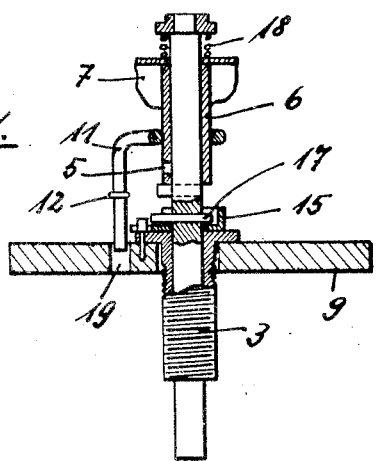
Inventor:
Christian Zwicker
by
Atty.

Patented Oct. 29, 1929

1,733,711

UNITED STATES PATENT OFFICE

CHRISTIAN ZWICKER, OF ESSLINGEN-ON-THE-NECKAR, GERMANY

VARIABLE CONDENSER

Application filed July 30, 1926, Serial No. 125,986, and in Germany June 28, 1926.

My invention refers to condensers and more especially to a variable condenser adapted for use in the tuning of an oscillation circuit to a predetermined wave length. The condenser according to my invention belongs to the type in which with constant surface area the variation of capacity is effected by varying the distance between the electrodes. The novel condenser involves the advantage of forming a self-contained structure closed in a dust-tight manner and allowing to obtain an absolutely uniform regulation through an angle of 360°. This condenser comprises two electrodes having the form of rotation bodies closed on one side and which are arranged co-axially and in the same direction, one electrode being fixed, while the other, which is enclosed within the first electrode can be displaced in axial direction, so that the distance between the electrodes can be varied for the purpose of variations of capacity by simply turning the adjusting disc. Preferably the two electrodes have the form of hollow conical or frusto-conical bodies, the outer one being fixed to the foundation plate and entirely surrounding and enclosing the movable electrode. This latter can be displaced axially in any suitable manner, preferably by means of a cam member connected with it, which is acted upon by a pin mounted on the regulating spindle fixed to the adjusting disc. According to the pitch of the cam member any desired characteristic of the increase of capacity can be obtained.

In the drawings affixed to this specification and forming part thereof a condenser embodying my invention is illustrated diagrammatically by way of example.

In the drawings

Fig. 1 is a side elevation, partly in section,

Figs. 2 and 3 are cross-sections on the lines 2—2 and 3—3 in Fig. 1,

Fig. 4 is a view resembling Fig. 2, but showing the parts in a different position.

Figs. 5-8 are four partial plan views of the means limiting the rotation of the movable electrode, showing the parts in four different positions.

Figs. 9 and 10 are axial sections, partly in side elevation, on the lines 9—9 in Fig. 3 and 10—10 in Fig. 4, respectively, showing the parts in different positions.

Fig. 11 is an axial section on the line 11—11 in Fig. 4.

Referring to the drawings, 1 (Fig. 1) is the adjusting disc showing a graduation as usual. 2 is the adjusting spindle and 3 is a threaded sleeve fixed in the base plate 9 and supporting the spindle. 4 is the adjusting pin fixed to the adjusting spindle 2 and acting on the cam face 5 of the sleeve-shaped cam member 6 which is fixed to the inner electrode 7 having the form of a hollow cone. This inner movable electrode 7 is surrounded by and enclosed in the fixed outer electrode 8 having a similar conical form and being fixed in a dust-tight manner on the base plate 9 by means of screws 10, thus acting as a protection for the movable electrode. On the cam member 6 is mounted a rectangularly bent arm 11 which is acted upon by one end of a coil spring 12, the other end of which is fixed to the base plate 9, this spring causing the arm 11, the free end of which extends into a larger perforation 19 of the base plate, to be always applied against the wall of this perforation. A coil spring 18 inserted between the fixed and the movable electrode serves for holding the cam member applied against the pin 4, thereby warranting an adjustment of the electrode 7 free from any play, while securing an easy displacement thereof without the danger of jamming.

The electrodes are prevented from contacting by a check 13 fixed on the base plate 9 and cooperating with an arm 14 forming part of a ring 15, loosely rotatable on the spindle 2. This ring is cut out at 16 and a check bolt 17 fixed to the spindle 2 projects into the gap 16. The width of the gap is chosen in proportion to the width of the arm 14 and the diameter of the bolt 17 in such manner that the spindle is free to effect an angular movement of 360°, but not more.

This will appear from Figs. 5 to 8. Figs. 5 and 6 illustrate the rotation of the spindle in counter clockwise direction, while Figs. 7 and 8 illustrate the rotation in clockwise direction. In Fig. 5 the check bolt 17 of spindle 2 is shown as extending into the gap 16 of the ring without contacting with one of the end walls of the gap. In Fig. 6 the bolt 17 is shown as applied to one end wall of the gap, the ring being thus carried along by the spindle in the direction shown by the arrow. The position shown in Fig. 7 corresponds to that shown in Fig. 5, however the parts are about to be rotated in the opposite direction, and Fig. 8 shows how the ring 15 is carried along in clockwise direction by the bolt 17.

The inner surface of the fixed electrode is preferably covered with an insulating coating 20, which may for instance consist of mica.

I wish it to be understood that I do not desire to be limited to the exact details of constructions shown and described for obvious modifications will occur to a person skilled in the art.

I claim:—

1. A variable condenser comprising a base plate, two hollow substantially cone-shaped electrodes, the first one being mounted with its broad end on and closed by said base plate, the second one extending into the hollow of said first electrode, a spindle extending through said base plate, a sleeve extending into the hollow of said second electrode and surrounding said spindle and an operative connection comprising a cam between said sleeve and said spindle for axially displacing said second electrode.

2. A variable condenser comprising a base plate, two hollow substantially cone-shaped electrodes, the first one being mounted with its broad end on and closed by said base plate, the second one extending into the hollow of said first electrode, a spindle extending through said base plate, a sleeve extending into the hollow of said second electrode and surrounding said spindle, an operative connection comprising a cam between said sleeve and said spindle for axially displacing said second electrode, means for securing said second electrode against rotation and resilient means for maintaining said operative connection.

3. A variable condenser comprising a base plate, two hollow substantially cone-shaped electrodes, the first one being mounted with its broad end on and closed by said base plate, the second one extending into the hollow of said first electrode, a spindle extending through said base plate, a sleeve extending into the hollow of said second electrode and surrounding said spindle, an operative connection comprising a cam between said sleeve and said spindle for axially displacing said second electrode, an arm fixed to said second electrode and abutting against said base plate for securing said second electrode against rotation and resilient means for maintaining said operative connection.

4. A variable condenser comprising a base plate, two hollow substantially cone-shaped electrodes, the first one being mounted with its broad end on and closed by said base plate, the second one extending into the hollow of said first electrode, a spindle extending through said base plate, a sleeve extending into the hollow of said second electrode and surrounding said spindle, an operative connection comprising a cam between said sleeve and said spindle for axially displacing said second electrode, an arm fixed to said second electrode and abutting against said base plate and a spring fixed to said arm and to said base plate for securing said second electrode against rotation and resilient means for maintaining said operative connection.

5. A variable condenser comprising a base plate, two hollow substantially cone-shaped electrodes, the first one being mounted with its broad end on and closed by said base plate, the second one extending into the hollow of said first electrode, a spindle extending through said base plate into and serving for axially displacing said second electrode and means associated with said base plate and said spindle for preventing angular movement of said spindle through more than substantially 360°.

In testimony whereof I affix my signature.

CHRISTIAN ZWICKER.